Feb. 13, 1923.
H. S. ESCH
1,444,785
TREAD GUARD
Filed Aug. 30, 1920
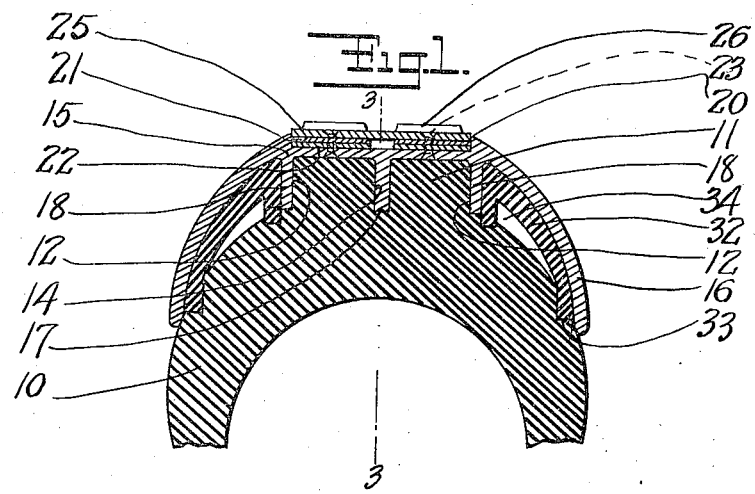
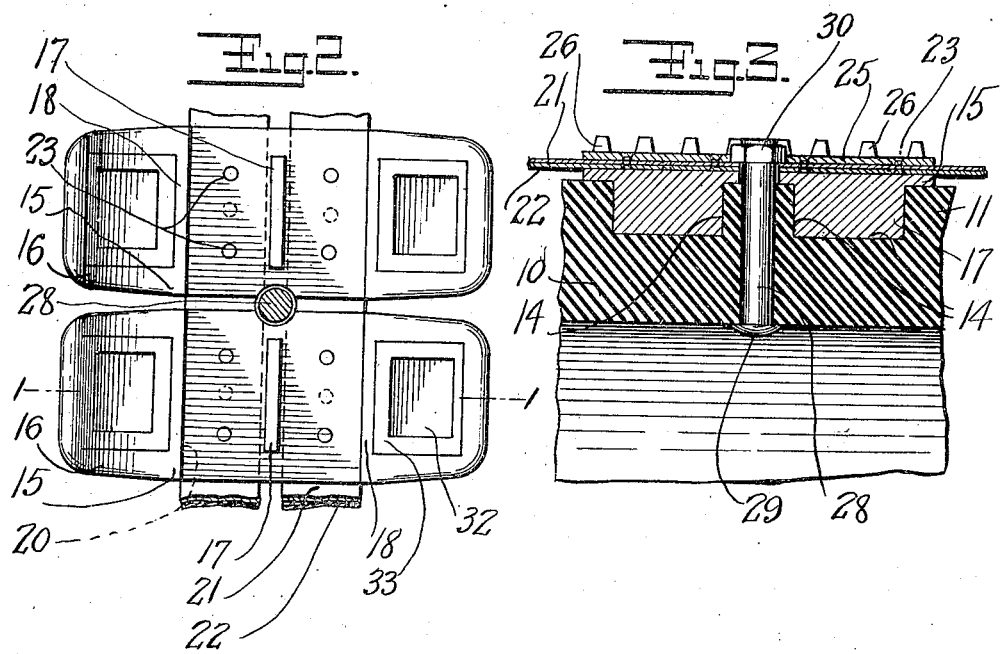
Inventor
Henry S. Esch
By his Attorney
Charles L. Wright Patented Feb. 13, 1923.

1,444,785

UNITED STATES PATENT OFFICE.

HENRY S. ESCH, OF NEW YORK, N. Y.

TREAD GUARD.

Application filed August 30, 1920. Serial No. 406,847.

*To all whom it may concern:*

Be it known that I, HENRY S. ESCH, a citizen of the United States, residing in the Bronx, in the county of Bronx and State of New York, have invented certain new and useful Improvements in Tread Guards, of which the following is a specification.

This invention has as its principal object the provision of means whereby a pneumatic tire is protected from punctures and abrasions by various articles on the roadway, such as nails, glass, sharp stones, etc.

Another object is to provide a tire guard which also acts to prevent skidding and undue wear of the tire.

These and other like objects are attained by the novel construction and combination of parts, hereinafter described and shown in the accompanying drawings, forming a material part of this disclosure, and in which:—

Figure 1 is a transverse sectional view, taken approximately on line 1—1 of Figure 2.

Figure 2 is a bottom plan view of the guard elements, the tire being removed.

Figure 3 is a fragmentary longitudinal cross sectional view of the tire, taken on line 3—3 of Fig. 1.

Referring to the drawings in detail the numeral 10 designates the tire, which has a raised portion or integral ring 11 extending circumferentially around its center, the same having flat parallel sides 12 and containing a plurality of spaced recesses 14 of rectangular contour.

A plurality of plates 15, having curved wing elements 16, are adapted to be disposed in close spaced relation over the surface of the tire, the same being held in position by integral tenons 17 fitting the recesses 14, similar projections 18 being suited to the sides 12 of the raised portion of the tire.

Approximately in register with the projections 18, in the outer surface of the plates, are transverse recesses 20 suited to receive two pairs of flexible metallic bands 21 and 22, respectively upper and lower, arranged side by side and secured to the plates by rivets 23.

Disposed on these bands, over the guard plates 15 are calk plates 25, presenting a plurality of spaced projections or spurs, arranged transversely of the tread and adapted to engage the road-way and prevent slipping or skidding of the wheel. These calk plates are firmly held to the bands and guard plates by the rivets, in addition to being seated in the recesses 20.

At suitable intervals, as every fourth or fifth guard plate bolts 28 are passed through the tire carcass, their thin rounded heads 29 being drawn tightly against the interior of the tire by nuts 30, the body of the bolt passing freely between adjacent plates and bands as best shown in Figure 2, the nut impinging on the pairs of bands as shown.

Between the wings 16 and exterior of the tire are inserted suction cups 32, the same being made of pliable material, as rubber, presenting an essentially rectangular profile, the edges 33 being slightly embedded in the tire presenting air chambers 34, as can best be seen in Fig. 1.

These suction cups, arranged on both sides of the tire, below the guard plates, tend to increase the resiliency of the tire and at the same time, to prevent creeping of the plates upon its surface.

The ends of the bands 21—22 are joined together by any preferred means and serve to hold the plates in position on the tire, they being held at intervals by the bolts 28.

From the foregoing it will be seen that a neat appearing and effective tire guard has been disclosed by which the life of a tire may be prolonged over the usual period while punctures and skidding are avoided.

Having thus described my invention, what I claim as new and desire to secure by Letters Patent, is:—

1. In combination with a tire, a plurality of metallic calk plates disposed directly over the periphery of the tire, yielding bands circumferentially engaging said plates, resilient members combined with said plates embracing a portion of the sides of the tire, adjacent to its periphery, rows of rivets positively uniting said calk plates and resilient members with the bands, and bolts at intervals engaging said bands directly with the tire.

2. In combination with a tire, a plurality of plates engageable therewith, said plates having curved ends, engaging with the sides of said tire, one or more bands flexibly uniting said plates, projections extending at the opposite sides of said plates, calk-plates confined by said projections on to each of the first named plates, means for uniting said plates including the bands, and means for attaching the same to said tire at intervals around its circumference.

3. The combination with a tire body having a series of depressions in its outer tread portion, of an anti-skidding device comprising a plurality of tread plates bridging said depressions, each plate being provided with pockets in its inner face, air chambered resilient members fitted within said pockets and contacting with the tire body, and projections on each plate engaged in the channel in the tire body.

4. An armored tire comprising a shoe having a raised central ridge containing depressions, oppositely disposed chambered cups, a multiplicity of tread plates having ribs engageable in said depressions, sockets upon the under faces of said plates receiving said cups, and bands connecting said tread plates receivable in said channel.

5. An armored tire comprising a shoe having a raised circumferential ridge containing depressions, a multiplicity of tread plates having ribs engageable in said depressions, sockets in said tread plates, cups in said sockets and bands connecting said tread plates receivable in said channel, said plates having inwardly extending ribs between which said bands are disposed.

6. An armored tire comprising a shoe having a ridge element containing depressions, tread plates with ribs engageable in said depressions, sockets in said tread plates, cups in said sockets, circumferential bands, winged plates transversely disposed and attached thereon, means for uniting said tread plates, bands and winged plates in intimate relation, circumferentially spaced radially positioned annular openings through the tread portion of said shoe and means for securing said plate combination to said shoe.

In testimony whereof I have signed my name to this application.

HENRY S. ESCH.